United States Patent [19]

Torigoe

[11] Patent Number: 4,805,995
[45] Date of Patent: Feb. 21, 1989

[54] LIQUID CRYSTAL DISPLAY WITH SMALL CARBON PARTICLES IN ITS MARK

[75] Inventor: Tsunemitsu Torigoe, Iwaki, Japan

[73] Assignee: Alps Electric Co., Ltd., Japan

[21] Appl. No.: 147,243

[22] Filed: Jan. 21, 1988

[30] Foreign Application Priority Data

Apr. 24, 1987 [JP] Japan .................................. 62-102439

[51] Int. Cl.$^4$ .............................................. G02F 1/133
[52] U.S. Cl. .................... 350/339 R; 350/311;
350/339 F; 106/23; 428/323
[58] Field of Search ..................... 350/339 F, 311, 317;
252/586; 427/162, 168; 428/323, 336, 338, 1;
106/22, 23

[56] References Cited

U.S. PATENT DOCUMENTS

| | | | |
|---|---|---|---|
| 4,264,678 | 4/1981 | Nelsen et al. ..................... | 106/23 X |
| 4,591,240 | 5/1986 | Masaki et al. ................ | 350/339 F X |
| 4,600,274 | 7/1986 | Morozumi ....................... | 350/339 F |
| 4,733,948 | 3/1988 | Kitahara .......................... | 350/339 F |

FOREIGN PATENT DOCUMENTS 0024560 2/1986 Japan .

*Primary Examiner*—John S. Heyman
*Assistant Examiner*—David Lewis
*Attorney, Agent, or Firm*—Guy W. Shoup; Paul J. Winters

[57] ABSTRACT

A liquid crystal display device comprises a black mask layer formed by ink wherein particles of carbon have a diameter ranging from about 0.1 to about 0.3 microns. The carbon particle size is effective to inhibit carbon particles from aggregating themselves into a projection which may establish electric connection between a common electrode and a segment electrode of the liquid crystal display device. This improves the reliability of the liquid crystal display device and the yield upon production of liquid crystal display devices.

1 Claim, 1 Drawing Sheet

LIQUID CRYSTAL DISPLAY WITH SMALL CARBON PARTICLES IN ITS MARK

BACKGROUND OF THE INVENTION

This invention relates to a liquid crystal display device (LCD) of the transmission type on which a light interrupting black mask layer is formed.

Conventionally, a liquid crystal display device of the transmission negative display type is known which is covered, except a display pattern thereof, with a mask layer to interrupt transmission of light through a background area thereof. One of such mask layers for interrupting transmission of light is a black mask layer which is formed by application of black ink using a technique of offset printing or the like.

FIG. 1 shows an exemplary one of such liquid crystal display devices having such a black mask layer formed thereon. Referring to FIG. 1, the liquid crystal display device shown in generally denoted at 1 and includes a liquid crystal cell 2, a pair of polarizing plates 3 applied to opposite outer faces of the liquid crystal cell 2, and a color filter 4 applied to one of the polarizing plates 3. The liquid crystal cell 2 includes an upper glass substrate 5, a lower glass substrate 6, and a liquid crystal layer 7 formed between the upper and lower glass substrates 5, 6 and enclosed airtight by means of sealing elements not shown. A common electrode 9 is formed on an inner face of the upper glass substrate 5 via an undercoat 8 made of silicon carbide, and an orientation film 10 is formed on an inner face of the common electrode 9. Meanwhile, a plurality of segment electrodes 12 constituting a display pattern are formed on an inner face of the lower glass substrate 6 via another undercoat 11 made of silicon carbide. A plurality of black mask layers 13 constituting a background area are formed at locations of the undercoat 11 other than those locations on which the segment electrodes 12 are formed. Here, the black mask layers 13 are formed by application of black ink by offset printing or the like as described above. Further, another orientation film 14 is formed on the undercoat 11 and covers the segments electrodes 12 and the black mask layers 13. Liquid crystal is filled between the orientation film 10 of the upper glass substrate 5 and the other orientation film 14 of the lower glass substrate 6 to form the liquid crystal layer 7.

In the liquid crystal cell 2, the polarizing plates 3 are applied to the outer faces of the upper glass substrate 5 and the lower glass substrate 6 such that polarization axes thereof may coincide with each other, and the color film 4 is applied to an outer face of one of the polarizing plates 3 adjacent the lower glass substrate 6.

By the way, it is a problem that, when liquid crystal display devices of such a construction as described above are produced, the ratio of rejects due to electric connection between a common electrode and a segment electrode is relatively high and accordingly the yield upon production is low. The inventors have made several investigations of a cause of this and found out that it is a principal cause that, because particles of carbon in the back ink forming a black mask layer normally have a diameter of 0.4 to 0.8 microns and are thus relatively large and non-uniform, they are apt to aggregate themselves and such aggregations of carbon particles on the black mask layers 13 may make a projection 15 as shown in FIG. 2 which extends to the common electrode 9 to short-circuit the common electrode 9 and a segment electrode 12.

Here, it may seem recommendable, as means for removing such projections 15 caused by aggregation of carbon particles, to roll surfaces of the black mask layers 13 by means of a roll or the like around which a silicone rubber sheet is wrapped so as to crush such projections 15. However, it is difficult to crush such projections 15 because carbon is hard compared to silicone rubber. Therefore, such crushing is insufficient to remove the projections 15 to prevent electric connection between the common electrode 9 and a segment electrode 12.

SUMMARY OF THE INVENTION

Accordingly, it is an object of the present invention to prevent appearance of projections in a liquid crystal display device caused by aggregation of carbon particles to prevent possible electric connection between a common electrode and a segment electrode of the liquid crystal display device in order to improve the reliability of the liquid crystal display device and to improve the yield upon production of liquid crystal display devices.

In order to attain the object, a liquid crystal display device according to the present invention comprises a black mask layer formed by ink wherein particles of carbon have a diameter ranging from about 0.1 to about 0.3 microns.

Accordingly, with the liquid crystal display device, particles of carbon in the ink of the black mask layer have a relative small diameter and are substantially uniform in size. Consequently, aggregation of carbon particles to form a projection is inhibited, and electric connection between a common electrode and a segment electrode can be prevented.

Here, the reason why the diameter of carbon particles is selected to range from about 0.1 to about 0.3 microns is that it exceeds 0.3 microns, inhibition of aggregation of carbon particles may be insufficient so that there may be some probability of appearance of projections of carbon, and where the diameter is smaller than 0.1 micron, it is technically difficult to produce carbon material of such particle size and use of such carbon material will raise the cost of the liquid crystal display device.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
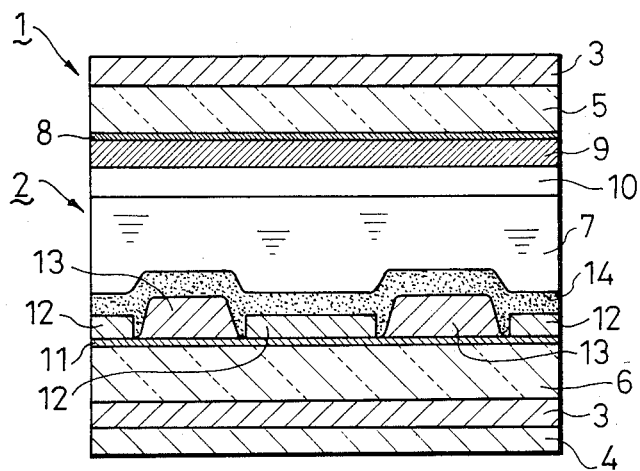
FIG. 1 is a schematic cross sectional view showing the general construction of a liquid crystal display device according to the present invention.
Figure 2:
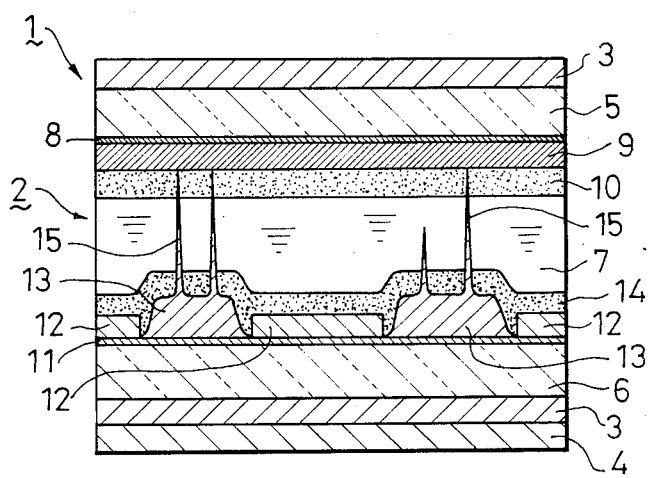
FIG. 2 is a similar view but illustrating a projection which is caused by aggregation of carbon particles in a liquid crystal display device.

As embodiments of the present invention, liquid crystal display devices A, B were produced, and as a reference for comparison, a liquid crystal display device C was produced. Here, the liquid crystal display devices A, B, C commonly have such a structure as shown in FIG. 1, and only one difference thereamong resides in diameter of particles of carbon in black ink which forms black mask layers 13.

In particular, the liquid crystal display devices A, B, C utilize carbon materials wherein particles thereof are regulated so as to have substantially uniform diameters of 0.1 micron or so, 0.3 microns or so, and 0.5 microns or so, respectively. Black inks used which employed such carbon materials consist of a mixture of uniformly dispersed 15 to 18 percent by weight of such carbon materials, 50 to 60 percent by weight of alkyd resin varnish, 10 to 15 percent by weight of petroleum hydrocarbons (of a boiling point from 300° to 340° C.), 1 to 1.5 percent by weight of a dryer, and 0.5 percent by weight of a drying retarder.

Black masks 13 of each of the black inks containing carbon materials of such particle sizes as described above were formed by applying, by offset printing, the black ink for the liquid crystal display device A, B or C via an under coat 11 to an inner face of a lower glass segment 6 having segment electrodes 13 formed in advance thereon and then heating the black ink at a temperature of 160° C. or so for about one hour to dry the black ink. In this instance, the black mask layers 13 were formed with a thickness of 0.5 to 3 microns.

Surfaces of the black mask layers of the liquid crystal display devices A, B, C using the carbon materials of different particle sizes were observed on electronic microscope photographs and so on. Such observations proved that the liquid crystal display devices A and B wherein the carbon particle size is 0.1 micron or so and 0.3 microns or so, respectively, presented no observable projection caused by aggregation of carbon particles while the liquid crystal display device C wherein the carbon particle size is 0.5 microns or so presented observable projections which projected 5.5 to 9.5 microns or so from a surface of the black mask layers.

It is to be noted that while in the example shown in FIG. 1 the black mask layers 13 are formed on the lower glass substrate 6 on which the segment electrodes 12 are formed, such black mask layers may otherwise be formed on the common electrode 9 of the upper glass substrate 5. In the latter case, the black mask layers are located so as to make a background area relative to the display pattern formed by the segment electrodes 12.

As apparent from the foregoing description, a liquid crystal display device according to the present invention comprises a black mask layer formed by ink wherein particles of carbon have a diameter ranging from about 0.1 to about 0.3 microns. Accordingly, carbon particles in the ink have a small and substantially uniform diameter or size, and consequently aggregation of carbon particles is inhibited so that no projection appears on a surface of black mask layers. As a result, electric connection between a common electrode and a segment electrode is prevented, which prevents rejected liquid crystal display device products caused by such electric connection. Accordingly, improvement of the reliability of a liquid crystal display device can be anticipated, and the yield upon production of liquid crystal display devices can be anticipated.

Having now fully described the invention, it will be apparent to one of ordinary skill in the art that many changes and modifications can be made thereto without departing from the spirit and scope of the invention as set forth herein.

What is claimed is:

1. In a liquid crystal display device wherein a black mask layer is formed on an inner face of a substrate, the improvement wherein particles of carbon in ink which forms said black mask layer have a diameter ranging from about 0.1 to about 0.3 microns.

* * * * *